United States Patent [19]

Lenox et al.

[11] Patent Number: 5,187,203
[45] Date of Patent: Feb. 16, 1993

[54] NON-CORROSIVE ELASTOMERIC FOAM FOR INSULATING COPPER TUBES

[75] Inventors: Ronald S. Lenox, Lancaster, Pa.; Kim S. Boyd, Quincy, Mass.; William S. Vought, Jr., Landisville, Pa.

[73] Assignee: Armstrong World Industries, Inc., Lancaster, Pa.

[21] Appl. No.: 781,418

[22] Filed: Oct. 23, 1991

[51] Int. Cl.$^5$ .............................. C08J 9/00; C08J 9/30
[52] U.S. Cl. ........................ 521/75; 428/36.9; 521/85; 521/92; 521/94; 521/98; 521/139; 521/140
[58] Field of Search ............ 521/75, 85, 92, 94, 521/98, 139, 140; 428/36.9

[56] References Cited

U.S. PATENT DOCUMENTS

| | | | |
|---|---|---|---|
| 2,811,493 | 10/1957 | Simon et al. | 260/2.5 |
| 3,695,477 | 10/1972 | Edmonston et al. | 521/75 |
| 4,245,055 | 1/1981 | Smith | 521/75 |
| 4,454,250 | 6/1984 | Florence et al. | 521/75 |

Primary Examiner—Morton Foelak

[57] ABSTRACT

A composition and foam insulation for copper tubing is described herein which is formulated to retard copper oxidation and eliminate or reduce stress corrosion in the copper tubing. The copper compatible, elastomeric foam insulation is made from a composition comprising 100 parts by weight of rubber, vinyl chloride polymer at about 15 to about 85 pphr, a plasticizer selected from the group consisting of an alkyl phosphate ester and an oxyalkyl phosphate ester at about 10 to about 100 pphr, a fire retardant in an amount of at least about 100 pphr, a stabilizer in an amount effective to prevent degradation of the rubber and vinyl chloride polymer, a preservative at from about 0.1 to about 10 pphr, and a lubricant at about 10 to about 85 pphr, wherein the composition and foamed product contains no more than about 5 parts of free phenol per million.

9 Claims, No Drawings

NON-CORROSIVE ELASTOMERIC FOAM FOR INSULATING COPPER TUBES

BACKGROUND OF THE INVENTION

1. Field of the Invention

Elastomeric foam is used to insulate copper tubing. Stress corrosion, however, presents a special problem in this field. This corrosion, also known as stress corrosion cracking, starts with the formation of small intergranular cracks in copper tubing. Largely unnoticed and, therefore, unchecked, the condition which causes the development of the cracks eventually causes the cracks to propagate through the thickness of the copper tubing. The tube will either begin to leak or, dangerously and more seriously, the weakened tube can explode, allowing pressurized materials in the tube to escape violently.

The present invention offers a solution to the stress corrosion problem of copper tubing insulated with elastomeric foam and provides a specially formulated elastomeric foam for copper tubing. Since foam insulation is required to meet high fire retardancy standards, the instant invention is also concerned with elastomeric foam insulation which passes fire standards in addition to being copper-compatible. Preferred embodiments of the heat insulative foam are, therefore, presented which are particularly fire retardant.

2. Brief Description

In order to successfully retard copper oxidation and eliminate or reduce stress corrosion in the insulated copper tubing, a foam insulation is described herein which has been formulated to avoid the addition of phenol and ingredients which yield free phenol. This is a highly effective solution to the stress corrosion problem.

Stress corrosion has been found in the copper after the copper surface oxidizes rapidly. Factors which cause rapid copper oxidation and stress corrosion of copper are phenol, ammonia, and a high pH. Ammonia is present in all elastomeric insulations in at least small amounts. It forms during the process for making the foam when the blowing agent reacts to foam the product. The most feasible way to avoid stress corrosion, therefore, is to produce a phenol-free insulation or at least reduce the concentration of the phenol to a level which can be tolerated.

A copper-compatible elastomeric foam insulation comprises a foamed mixture of: rubber at 100 parts by weight, a vinyl chloride polymer in an amount of from about 15 to about 85 parts, a plasticizer selected from the group consisting of an alkyl phosphate ester and an oxyalkyl phosphate ester at an amount in the range of from about 10 to about 100 parts, at least about 100 parts of a fire retardant, a stabilizer at an amount up to about 10 parts, a preservative at an amount of from about 1.0 to about 10 parts, and a lubricant at an amount of from about 10 to about 85 parts by weight (wt.), wherein the foamed mixture contains no more than about 5 parts of free phenol per million.

By limiting the amount of free phenol in the insulation, contact with copper tubing can be maintained, but rapid copper oxidation and stress corrosion will be deterred. For this reason, the term "copper-compatible" is used to describe the insulation and compositions from which the insulation is made.

The elastomeric foam insulation must also meet the standard requirements in fire retardancy and for flame spread and smoke. Another problem is encountered in meeting fire standards because one cannot include aryl or arylalkyl phosphate ester plasticizers, since ingredients of this nature (containing aryl moieties) will, as a general rule, increase the amount of the free-phenol beyond the tolerance level. This can either be due to the release of phenol from the compound itself, or due to phenol impurities that can be inherent in the ingredient when added. However, without the aryl-containing phosphate plasticizers, the insulation normally has a flammability level that is too high to meet the required flammability standards.

Preferred embodiments, therefore, contain other additional ingredients which allow the copper tube insulation to meet required flammability standards. Accordingly, such embodiments will include ingredients such as char forming agents (char formers), flame retardants, and chlorinated lubricants. These ingredients allow foam insulation to meet flammability standards even if it is formulated with alkyl phosphate esters and does not contain the aryl phosphate esters.

DETAILED DESCRIPTION

Elastomeric foam insulation is fixed around copper tubing, thereby providing thermal insulation for the copper pipe. Stress corrosion is a problem which develops in the copper being insulated. This corrosion, visually recognized by the hair-line cracks which develop in the copper itself, eventually results in leaks and sometimes even violent explosions of pressurized materials.

According to the present invention, the stress corrosion is prevented (making the insulation copper compatible) by avoiding conditions that cause rapid copper oxidation. Accordingly, formulations of foam insulation described herein exclude phenol and ingredients that can lead to phenol formation. Suitable alkyl phosphate esters and oxyalkyl phosphate esters are used. The effective use of such fire retardants which do not contain aryl groups to obtain high degrees of fire retardancy is surprising since normally alkyl or oxyalkyl phosphate esters do not impart high levels of fire retardancy.

The copper-compatible elastomeric foam-forming composition and the insulative foam made by it has the amount of free phenol at a maximum of about 5 parts per million (parts by weight). In preferred embodiments, the formulation both limits the level of free phenol and prohibits the addition of compounds with either the alkaline or alkaline-earth metal oxides (frequently used as water scavengers). Compounds with these metals produce and tend to stabilize an undesired pH level of 9.5 or greater.

The amount of free phenol in the present insulation must be no more than about 5 parts per million (ppm). Preferably, it is less than about 3 ppm. In order to obtain these low levels of free phenol, the aryl (especially phenyl-containing) phosphate esters must be avoided. Compounds having the phenyl moiety are especially avoided because of the phenol levels which their presence would cause.

The prohibited aryl phosphate esters are defined as an ester of phosphoric acid and a phenolic compound. The acid may be esterified by one, two or three phenolic groups. Hydrolysis of these aryl phosphate esters have experimentally been shown to produce free phenol in elastomeric insulation. The alkyl and oxyalkyl phosphate esters are, therefore, used instead, and the addition and use of fire-retarding and char-forming additives provides an insulation which meets fire and smoke requirements.

With the mandatory elimination of aryl compounds like these, however, another problem is encountered. For safety reasons this elastomeric foam is required to meet high fire standards. Because of these standards, plasticizers with aryl moieties are a popular ingredient for elastomeric foam. The aryl-containing phosphate ester plasticizers are particularly successful at increasing fire resistance of the foams. Several embodiments of the instant invention, however, obtain the copper-compatible insulation by prohibiting compounds such as these plasticizers. Without these compounds, it is particularly difficult to meet the fire and smoke standards set for elastomeric foam insulation.

In order to meet these high fire and smoke requirements and yet still deliver copper-compatibility in the foam, particular preferred embodiments are provided. Preferably, the elastomeric foam insulation contains a fire retardant, a char former, and halogenated lubricating ingredients. In some embodiments, the halogenated lubricant optionally could also serve as a char former.

The fire retardant preferably is included at an amount of at least about 100 parts per hundred parts of rubber (pphr). A preferred concentration range for the fire retardant is from about 200 to about 600 parts per hundred parts of rubber.

Suitably, a fire retardant can be selected from the group consisting of magnesium hydroxide, magnesium carbonate, and aluminum trihydrate (ATH). The most preferred of these is ATH. In fact, for the preferred embodiments which exclude alkaline and alkaline earth oxides, the fire retardant will consist of aluminum trihydrate.

A char-forming additive can suitably be selected from the group consisting of antimony oxide, brominated organics, chlorinated organics, and iron oxide. Preferably, the organic moieties used are chlorinated paraffins. Preferably, the char former is iron oxide due to its abilities as both a char builder and hardener. Another preferred embodiment includes both antimony oxide and a halogenated paraffin (both a lubricant and char former).

Suitably, the char-forming additive is included at an amount of at least about 5 pphr, and preferably it is present at an amount of at least about 10 pphr. Preferably, it is used at an amount in the range of from about 10 to about 45 pphr of rubber. A very effective and preferred combination is antimony oxide at an amount of at least about 2.5 parts, suitably from about 2.5 to about 10 pphr of rubber, and iron oxide at an amount of at least about 5 parts, suitably from about 5 to about 35 pphr of rubber.

The lubricant used can include waxes, glycols, fats, and salts of fatty acids. Such ingredients could, for example, be selected from the group consisting of stearic acid, paraffin wax and stearamid. Ingredients such as halogenated paraffin, included as lubricants, also help to cause additional char forming. Halogenated lubricants are, however, highly preferred. These halogenated lubricants are relied on to help maintain a high fire and smoke performance.

Suitably, the lubricant is comprised of from about 1 to about 50% by wt. of the non-halogenated ingredients. Preferably, the halogenated lubricants are included at an amount in the range of at least from about 5 pphr, and preferably is present at an amount of from about 15 to about 60 pphr of rubber.

Suitably, the halogenated lubricant is chlorinated, and in preferred embodiments it can be selected from the group consisting of both chlorinated and brominated lubricants. This includes compounds having both halogens. Although the brominated lubricants are highly effective, due to the expense and the effectiveness of the chlorinated lubricants, the halogen of choice is generally chlorine. When the chlorinated lubricants are used, it is preferred that a lubricant selected from the group consisting of chlorinated polyethylene and chlorinated paraffin is included. Suitably, the chlorinated paraffin is at least about 10% by wt. chlorinated, and preferably is at least about 25% by wt. chlorinated. Highly preferred embodiments include chlorinated paraffin that is at least about 40% by wt. chlorinated.

The instant elastomeric foam insulation is prepared on the basis of having 100 parts (by weight) of rubber. Suitably, the rubber used will have a Mooney viscosity in the range of from about 25 to about 100. Rubber with the Mooney viscosity in this range will exhibit desirable processing and expansion (foaming) behavior. A preferred Mooney viscosity is in the range of from about 55 to about 95.

The rubber used may suitably be selected from the group consisting of acrylonitrile, acrylonitrile/butadiene, styrenebutadiene rubber (SBR) and polybutadiene. The preferred rubber used is acrylonitrile/butadiene.

A vinyl chloride polymer is included in the present foam insulation. The vinyl chloride polymers advantageously are miscible in the rubber, and their presence helps to obtain the desired fire properties. The vinyl chloride polymer also provides the foam with ozone resistance, good water vapor transmission properties, and char-forming characteristics.

Vinyl chloride polymers include both homopolymers and copolymers of vinyl chloride. Suitably, the vinyl chloride polymer can be selected from the group consisting of polyvinylchloride(vinylacetate) (PVCVA), polyvinylchloride (PVC), and polyvinylchloride(vinylidene chloride). Preferably, the vinyl chloride polymer is a mixture of PVC and PVCVA. These two can suitably be used at a ratio of about 10:1 (PVC:PVCVA) to 1:5. A preferred range is about 2:1 to 1:2. The ratio can be varied to provide differences in hand and flexibility of the insulating tube. One of ordinary skill will be familiar with the characteristics obtainable from varying the amounts of each of these respective ingredients.

The phosphate plasticizer which must be used for the present insulative foam is selected from the group consisting of an alkyl phosphate ester and an oxyalkyl phosphate ester. A preferred concentration of the plasticizer is in the range of from about 12 to about 55 pphr of rubber. For either the alkyl phosphate or the oxyalkyl phosphate, the number of carbon atoms in each alkyl moiety can suitably be in the range of from 2 to 12. Preferably, the number of carbon atoms in each alkyl group is in the range of from 4 to 8. A plasticizer having C4–C8 moieties is, therefore, preferred. Of these, it is preferred to select the plasticizer from the group consisting of tributyl phosphate ester and tributoxyethyl phosphate ester.

Notably, the tributoxyethyl phosphate ester is highly preferred since the preferred foam formulations having this plasticizer can pass the ASTM E-84 tunnel test, have excellent fire and smoke properties, and do not promote copper stress corrosion.

Stabilizers are used in an amount effective to prevent degradation of the rubber and PVC compounds, especially needed during processing. Acceptably these are used at amounts up to about 10 pphr. Suitably an organotin stabilizer is used, and a preferred amount is in the range of from about 0.05 to about 5 pphr.

Preservatives which are well known and preferred for use in the foams and compositions of the instant invention are anti-oxidants. These anti-oxidants are used against oxidation of polymers both during processing and use of the product. Suitably, the anti oxidant is an amine. Most preferably the amine is not soluble in water, since a high pH can also help to produce stress corrosion. In some embodiments, the anti-oxidant may contain a hindered phenol moiety. Anti-oxidants with sterically hindered phenolic moieties, having moieties of large steric bulk in the position ortho to the oxygen, could be used. With sufficient steric hindrance, this moiety will not enter into reactions on the copper surface as would non-hindered phenols.

Sterically hindered phenols and phenol groups have a phenol moiety which cannot take part in many chemical reactions characteristic of phenols. Such compounds do not show the same aggressive behavior toward copper as phenols which do not have this steric hindrance. Care should be used, however, to avoid manufactured ingredients and other additives which have phenol impurities in themselves. All ingredients to the formulation should be sufficiently phenol-free to give a formulation having a maximum of about 5 ppm of free phenol.

It is preferred for the present invention, however, that the anti-oxidant amine is water insoluble. Amines having high molecular weight are preferred. Most preferably, they are tertiary water insoluble. Suitable anti-oxidants are N,N'-di(2-octyl)-p-phenylenediamine and N-phenyl-N'octyl-p-phenylenediamine.

The instant invention can also be understood from the following examples. One of ordinary skill in this art will be familiar with procedures for the preparation of elastomeric foam insulation. Any steps or procedures suitable for elastomeric foam insulation can also be used, in addition to the preparation shown by the examples which follow. The following examples are offered to illustrate the present invention and should not be taken to limit it. Unless otherwise indicated, all parts and percentages are by weight (wt.).

MASTER BATCH PREPARATION

To make a master batch for the foamable elastomer, 100 parts (by weight) of nitrile rubber was used and the other ingredients were mixed with it in a Banbury mixer. The other master batch ingredients mixed in were 236 parts of aluminum trihydrate, 20 parts of carbon black, 20 parts of $Fe_2O_3$, 61 parts of PVC, 37 parts of chlorinated paraffin, 4 parts of epoxidized soy oil, 3 parts of antimony oxide, the plasticizer, and 23 parts of extrusion aids. The combination was mixed and heated slowly until it attained the range of 305°-315° F. Mixing continued within this range until the polymer blended into the rubber and the fillers and other powder ingredients were wetted out. Thereafter, the master batch was cooled and sheeted using a roll mill.

The extrusion aids are used to help in rehology and extrusion control. The rubber used was approximately 30–32% by wt. acrylonitrile with a Mooney viscosity of 70–90. The PVC used had a melting point which allowed the resin to melt and flux into the nitrile rubber. When the PVC was mixed with the rubber, the $T_g$ (glass transition temperature) of the nitrile rubber and the PVC used coalesced to give a new intermediate $T_g$.

The elastomeric foam insulation was made by blending the master batch with blowing agent and the ingredients for curing in a Banbury mixer within the temperature range of 170°-180° F. The final batch mixture was then put into a mill, sheeted, and cut into strips which were then put into a forming extruder which formed the mixture around tubular profiles for forming the foam into a cylindrical shape. The extrudate formed was then heated in an oven to foam and cure the samples into the insulative foam product.

EXAMPLE 1

Parts A and B of this example offer a comparison of foam insulation samples that were prepared according to the above foam preparation procedure. Except for the plasticizer, the ingredients used were the same for each preparation. Each foam sample was made with a different plasticizer.

Part A

A sample of elastomeric foam insulation was prepared from a master batch which was prepared in accordance with the preceding description. This sample had, as the plasticizer, 22 parts of tributoxyethyl phosphate ester. This master batch was mixed as indicated previously with the following blowing agent and curing ingredients: 47.5 parts of azodicarbonamide (blowing agent), 16.8 parts of zinc oxide, 0.5 parts of zinc dimethyldithiocarbamate, 3.3 parts of dipentamethylene thiuram tetrasulfide, 0.95 parts of zinc 2-mercapto benzothiazole, 4.4 parts of sulfur, and 2.2 parts of a blowing agent activator.

This sample was tested in the ASTM E-84 tunnel test and was analyzed for free phenol:

1) In the E-84 tunnel test, it was found that the material will give a flame spread of 25 or less and a smoke density of 50 or less.

2) It was found that this sample of insulation showed 1.2 parts per million (ppm) of free phenol.

Part B (for comparison)

Another sample of elastomeric foam insulation was prepared from a master batch which was prepared in accordance with the preceding description. This sample, however, used an alkyl diaryl phosphate ester (isodecyl diphenyl phosphate, S-148, Monsanto) as the plasticizer in the master batch in the amount of 25 parts.

To form the final batch, this master batch was mixed as indicated previously with the following blowing agent and curing ingredients: 47.5 parts of azodicarbonamide (Celogen AZ as the blowing agent), 16.5 parts of zinc oxide, 0.5 parts of zinc dimethyldithiocarbamate, 2.9 parts of dipentamethylene thiuram tetrasulfide, 0.95 parts of zinc 2-mercapto benzothiazole, 3.8 parts of sulfur, and 1.9 parts of a blowing agent activator.

This insulation was tested for free phenol. This test showed that this sample had 120 ppm of free phenol.

COPPER OXIDATION TEST

Each of the above samples (A and B) were ground, extracted in deionized water at 120° F. for 72 hours and the extracts were isolated. A copper tube was placed in each of the extracts, and the bottles were sealed. The copper was exposed to the extract for 12 weeks.

The tube that had been in the extract that was taken from the insulation made with the alkyl diarylphosphate was the first to develop black deposits of cupric oxide. At the end of the 12 weeks, the tube was colored by a coating of black cupric oxide. The other copper tube which had been immersed in the extract from the insulation having the tributoxyethylphosphate had only faint traces of black cupric oxide at the end of the 12 weeks.

What is claimed is:

1. A thermally-insulative, elastomer insulation for copper tubing comprising: a foamed mixture of 100 parts by weight of rubber, a vinyl chloride polymer in an amount of from about 15 to about 85 pphr, a plasticizer selected from the group consisting of an alkyl phosphate ester and an oxyalkyl phosphate ester at an amount in the range of from about 10 to about 100 pphr, a fire retardant in an amount of at least about 100 pphr, a stabilizer in an amount effective to prevent degradation of the rubber and vinyl chloride polymer, a preservative at an amount of from about 0.1 to about 10 pphr, and a lubricant at an amount in the range of from about 10 to about 85 pphr, wherein the foamed mixture contains no more than about 5 parts of free phenol per million to prevent stress corrosion.

2. The insulation of claim 1 wherein the fire retardant is aluminum trihydrate and the foamed mixture does not contain compounds having the alkaline or alkaline-earth metal oxides.

3. The insulation of claim 1 wherein the elastomeric foam insulation containing a char forming agent and a halogenated lubricating ingredient.

4. The insulation of claim 1 wherein the fire retardant is aluminum trihydrate and is present at an amount in the range of from about 200 to about 600 pphr.

5. The insulation of claim 3 with aluminum trihydrate as the fire retardant, with antimony oxide and iron oxide as the char-forming agent and having a chlorinated paraffin which is at least about 25% chlorinated.

6. The insulation of claim 1 wherein the foamed mixture contains less than about 3 parts per million of free phenol.

7. The insulation of claim 2 wherein the preservative is an antioxidant which is a water-insoluble amine.

8. A composition for the preparation of a copper-compatible, thermally-insulative elastomer insulation comprising: a mixture of 100 parts by weight of rubber, a vinyl chloride polymer in an amount of from about 15 to about 85 pphr, a plasticizer selected from the group consisting of an alkyl phosphate ester and an oxyalkyl phosphate ester at an amount in the range of from about 10 to about 100 pphr, a fire retardant in an amount of at least about 100 pphr, a stabilizer in an amount effective to prevent degradation of the rubber and vinyl chloride polymer, a preservative at an amount of from about 0.1 to about 10 pphr, and a lubricant at an amount in the range of from about 10 to about 85 pphr, wherein the composition contains no more than about 5 parts of free phenol per million.

9. The composition of claim 8 wherein the rubber had a Mooney viscosity in the range of from about 55 to about 95.

* * * * *